(12) United States Patent  
Kunieda et al.

(10) Patent No.: US 7,387,657 B2
(45) Date of Patent: Jun. 17, 2008

(54) HONEYCOMB STRUCTURAL BODY

(75) Inventors: Masafumi Kunieda, Gifu (JP); Atsushi Kudo, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 383 days.

(21) Appl. No.: 10/513,798

(22) PCT Filed: Oct. 7, 2003

(86) PCT No.: PCT/JP03/12841

§ 371 (c)(1),
(2), (4) Date: Nov. 18, 2004

(87) PCT Pub. No.: WO2004/031100

PCT Pub. Date: Apr. 15, 2004

(65) Prior Publication Data

US 2005/0235621 A1    Oct. 27, 2005

(30) Foreign Application Priority Data

Oct. 7, 2002    (JP) ............................. 2002-293690

(51) Int. Cl.
*B01D 46/00*    (2006.01)
*F01N 3/022*    (2006.01)

(52) U.S. Cl. .................. 55/523; 55/282.2; 55/282.3; 55/385.3; 55/482; 55/484; 55/502; 55/DIG. 10; 55/DIG. 30; 60/311; 428/116

(58) Field of Classification Search ................ 55/282.2, 55/282.3, 385.3, 482, 484, 502, 523, DIG. 10, 55/DIG. 30; 428/116, 117, 118; 60/295, 60/297, 299, 300, 303, 311
See application file for complete search history.

(56) References Cited

U.S. PATENT DOCUMENTS 4,293,357 A    10/1981    Higuchi et al.

(Continued)

FOREIGN PATENT DOCUMENTS

| EP | 1 277 714 A1 | 1/2003 |
| EP | 1 291 061 A1 | 3/2003 |
| EP | 1 340 734 A1 | 9/2003 |

(Continued)

OTHER PUBLICATIONS

U.S. Appl. No. 09/926,795, unknown filing date, unknown inventor.

(Continued)

*Primary Examiner*—Jason M. Greene
(74) *Attorney, Agent, or Firm*—Oblon, Spivak, McClelland, Maier & Neustadt, P.C.

(57) ABSTRACT

A honeycomb structural body is constituted with a ceramic block comprising a plurality of through-holes arranged in a longitudinal direction and separated from each other through partition walls, either end portions of which through-holes being sealed. The ceramic block constituting the honeycomb structural body is made of a composite material consisting of ceramic particles and crystalline silicon and having an excellent thermal conductivity, so that the honeycomb structural body is excellent in the thermal diffusibility but also excellent in the resistance to thermal shock because the storing of thermal stress is less and no crack is caused even if a temperature distribution is caused at a relatively low temperature or cool-heat cycle is repeated over a long period of time.

10 Claims, 8 Drawing Sheets

U.S. PATENT DOCUMENTS

| | | | |
|---|---|---|---|
| 5,914,187 | A | 6/1999 | Naruse et al. |
| 5,930,994 | A | 8/1999 | Shimato et al. |
| 6,447,564 | B1 | 9/2002 | Ohno et al. |
| 6,565,630 | B2 | 5/2003 | Ohno et al. |
| 6,669,751 | B1 | 12/2003 | Ohno et al. |
| 6,770,116 | B2 | 8/2004 | Kojima |
| 6,797,666 | B2 | 9/2004 | Harada et al. |
| 2002/0011683 | A1 | 1/2002 | Gadkaree et al. |
| 2003/0053940 | A1 | 3/2003 | Harada et al. |
| 2004/0031264 | A1 | 2/2004 | Kojima |
| 2004/0033175 | A1 | 2/2004 | Ohno et al. |
| 2004/0055265 | A1 | 3/2004 | Ohno et al. |
| 2004/0161596 | A1 | 8/2004 | Taoka et al. |

FOREIGN PATENT DOCUMENTS

| | | | |
|---|---|---|---|
| JP | 5-17227 | * | 1/1993 |
| JP | 08-182228 | | 7/1994 |
| JP | 2001-097777 | | 4/2001 |
| JP | 2001-199777 | | 7/2001 |
| JP | 2002-037673 | | 2/2002 |
| JP | 2002-060279 | | 2/2002 |
| JP | 2002-60279 | * | 2/2002 |
| JP | 2002-154876 | * | 5/2002 |
| JP | 2002-201082 | | 7/2002 |
| JP | 2002-273130 | | 9/2002 |
| JP | 2002-273131 | | 9/2002 |
| JP | 2003-146763 | | 5/2003 |
| WO | WO 01/79138 A1 | * | 10/2001 |
| WO | WO 01/93984 A1 | | 12/2001 |
| WO | WO 02/076579 A1 | | 10/2002 |
| WO | 03/071105 | | 8/2003 |
| WO | 03/093657 | | 11/2003 |
| WO | 03/093658 | | 11/2003 |
| WO | 2004/031100 | | 4/2004 |
| WO | 2004/076027 | | 9/2004 |
| WO | 2004/106702 | | 12/2004 |
| WO | 2004/111398 | | 12/2004 |
| WO | 2004/113252 | | 12/2004 |
| WO | 2005/000445 | | 1/2005 |
| WO | 2005/002709 | | 1/2005 |
| WO | 2005/005018 | | 1/2005 |

OTHER PUBLICATIONS

U.S. Appl. No. 10/129,126, unknown filing date, unknown inventor.
U.S. Appl. No. 10/787,089, filed Feb. 27, 2004, Kojima.
U.S. Appl. No. 10/490,206, filed Sep. 2, 2004, Hong et al.
U.S. Appl. No. 10/490,205, filed Sep. 9, 2004, Komori et al.
U.S. Appl. No. 10/493,056, filed Aug. 17, 2004, Hong et al.
U.S. Appl. No. 10/502,045, filed Jul. 29, 2004, Kudo et al.
U.S. Appl. No. 10/502,054, filed Jul. 30, 2004, Kudo et al.
U.S. Appl. No. 10/506,438, filed Sep. 2, 2004, Taoka et al.
U.S. Appl. No. 10/502,044, filed Jul. 29, 2004, Taoka et al.
U.S. Appl. No. 10/504,987, filed Aug. 19, 2004, Kojima.
U.S. Appl. No. 10/508,415, filed Sep. 21, 2004, Shibata.
U.S. Appl. No. 10/510,344, filed Oct. 6, 2004, Ohno.
U.S. Appl. No. 10/506,247, filed Sep. 9, 2004, Kudo.
U.S. Appl. No. 10/509,578, filed Sep. 29, 2004, Yamada.
U.S. Appl. No. 10/507,375, filed Sep. 21, 2004, Ohno et al.
U.S. Appl. No. 10/509,688, filed Oct. 12, 2004, Yamada.
U.S. Appl. No. 10/513,798, filed Nov. 18, 2004, Kunieda et al.
Derwent Publications, AN 1993-070915, XP-002370065, JP, 05-017227, Jan. 26, 1993.

* cited by examiner

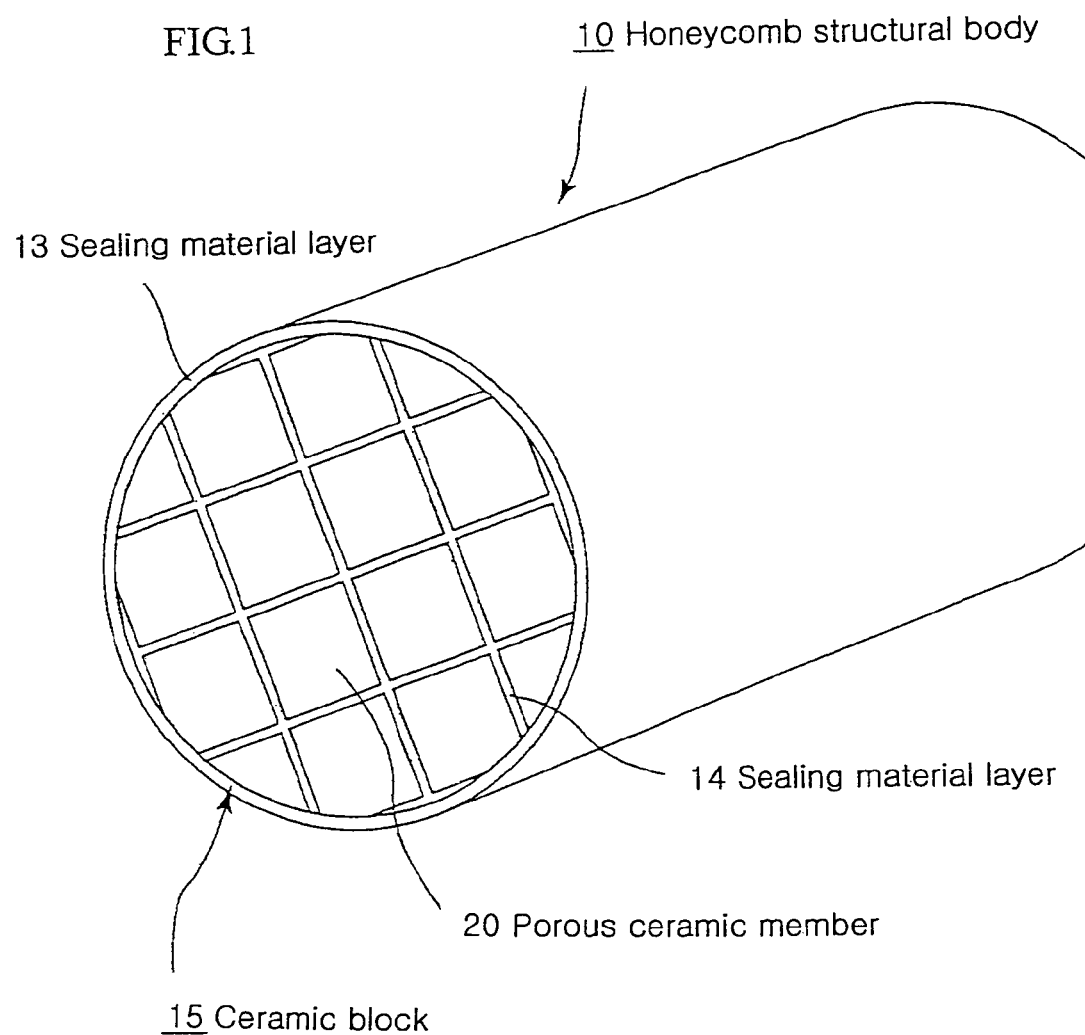

Section at A-A line

30 Honeycomb structural body
35 Ceramic block
31 Through-hole
33 Wall portion 30
35
31
33
32 Filler Section at B-B line

HONEYCOMB STRUCTURAL BODY

DESCRIPTION OF RELATED APPLICATION

This application is an application claiming Japanese Patent Application 2002-293690 filed Oct. 7, 2002 as a basic application.

1. Technical Field

This invention relates to a honeycomb structural body used as a filter removing particulates in an exhaust gas discharged from an internal-combustion combustion engine such as a diesel engine or the like, a catalyst carrying body or the like.

2. Background Art

Recently, it comes into problem that particulates included in an exhaust gas discharged from an internal-combustion engine of a vehicle such as bus, truck or the like, construction machines and the like badly affect the environment or human body.

There are proposed various ceramic filters capable of passing the exhaust gas through a porous ceramic to collect particulates in the exhaust gas to thereby purify the exhaust gas.

As such a ceramic filter is known a honeycomb filter constructed by arranging many through-holes side by side in one direction so as to function partition walls separating the through-holes with each other as a filter.

That is, the through-holes formed in the above honeycomb filter are sealed with a sealing material (plug) at their end portions at inlet side or outlet side of the exhaust gas to form a so-called checkered pattern, so that the exhaust gas flowed into one through-hole is necessarily passed through the partition wall separating the through-holes to flow out from the other through-hole, whereby the particulates are collected by a partition wall portion when the exhaust gas is passed through the partition wall to purify the exhaust gas.

The particulates are gradually deposited on the partition wall portions separating the through-holes of the honeycomb filter accompanied with the action of purifying the exhaust gas to cause the clogging to obstruct the passing of the gas. In the honeycomb filter, therefore, it is required to conduct a regeneration treatment wherein the filter is regenerated by periodically burning and removing the particulates, which cause the clogging, by means of a heating means such as a heater or the like.

As the honeycomb filter, there have hitherto been known ones made from silicon carbide or cordierite. However, the honeycomb filter is heated to a higher temperature by a high-temperature exhaust gas in the catching of the particulates or a heating means such as a heater or the like in the regeneration treatment, so that it is considered that the filter made of silicon carbide having an excellent heat resistance is useful.

As the honeycomb filter made of silicon carbide is disclosed a honeycomb filter produced by using silicon carbide powder as a starting material and shaping it into a given form and drying and firing (recrystallization method) it, for example, JP-A-6-182228.

Also, a honeycomb structural body formed by bonding ceramic particles of silicon carbide or the like with vitreous oxide selected from the group consisting of $SiO_2$, $Al_2O_3$, $B_2O_3$ and $Na_2O$ is disclosed, for example, in JP-A-2001-199777.

Further, a honeycomb structural body formed by adding metallic silicon and an organic binder to silicon carbide particles and mixing and kneading them and shaping into a honeycomb form and firing to bond the silicon carbide particles with the metallic silicon is disclosed, for example, in JP-A-2002-60279 or JP-A-2002-154876.

However, the honeycomb structural body disclosed in JP-A-2001-199777 is advantageous in the production cost as compared with the honeycomb filter disclosed in JP-A-6-182228, but is poor in the thermal conductivity and weak in the thermal shock because silicon carbide particles are bonded with each other through the vitreous oxide.

Also, the honeycomb structural bodies disclosed in JP-A-2002-60279 and JP-A-2002-154876 are excellent in the thermal conductivity and the resistance to thermal shock as compared with the honeycomb structural body disclosed in JP-A-2001-199777 because silicon carbide particles are bonded with each other through metallic silicon having a thermal conductivity more than that of the vitreous oxide.

However, the honeycomb structural bodies disclosed in JP-A-2002-60279 and JP-A-2002-154876 are hardly said to be sufficiently high in the thermal conductivity and have still a problem in the resistance to thermal shock because when a temperature distribution of relatively low temperature is caused or when cold-hot cycle is repeated over a long period, thermal stress is stored and cracks of visually confirmable degree are generated.

The invention is made for solving the above problems inherent to the conventional technique and is to provide a honeycomb structural body having an excellent thermal conductivity and an excellent resistance to thermal shock causing no occurrence of cracks even in the temperature distribution of relatively low temperature or the repetition of cold-hot cycle over a long period.

DISCLOSURE OF THE INVENTION

The inventors have made various studies for solving the problems of the conventional technique and found that as a material constituting the honeycomb structural body is effective a composite material consisting of ceramic particles and crystalline silicon, particularly a porous ceramic formed by bonding ceramic particles through crystalline silicon, and as a result the invention having the following contents has been accomplished.

That is, the invention is a honeycomb structural body constituted with a ceramic block comprising a plurality of through-holes arranged in a longitudinal direction and separated from each other through partition walls, either end portions of which through-holes being sealed, characterized in that the ceramic block is made of a composite material consisting of ceramic particles and crystalline silicon.

The honeycomb structural body according to the invention is characterized by constituting with a ceramic block made of a composite material consisting of ceramic particles and crystalline silicon in which a plurality of through-holes are arranged in a longitudinal direction and separated from each other through partition walls. The ceramic block may be constituted by binding a plurality of columnar ceramic block members having plural through-holes arranged in a longitudinal direction and separated from each other through partition walls with a sealing material layer (this honeycomb structural body is called as an aggregate-type honeycomb structural body hereinafter), or may be made of a ceramic member formed as a ceramic block as a whole (the filter is called as a one-piece type honeycomb structural body hereinafter).

When the honeycomb structural body according to the invention is the aggregate-type honeycomb structural body, the wall portion is comprised of partition walls separating the through-holes in the ceramic member, an outer wall of the ceramic member and a sealing material layer functioning as an adhesion material layer between the ceramic members, while in case of the one-piece type honeycomb structural body, it is comprised of only one kind of partition wall.

In the invention, the ceramic blocks constituting the honeycomb structural body are preferable that plural through-holes are sealed with a sealing material (plug) at one end portions and through-holes not sealed with the sealing material (plug) are sealed with a sealing material (plug) at the other end portions.

Because, the particulates can be caught more thinly by passing through the partition walls having an increased surface area, whereby the resistance in the passing of the exhaust gas can be reduced to lower the pressure loss.

In the invention, the composite material forming the ceramic block is preferable to be porous ceramic in which ceramic particles are bonded through a crystalline silicon.

Because, it is considered that the crystalline silicon is regularly aligned at an atomic level and is relatively high in the thermal conduction and the like.

In the invention, the ceramic particles constituting the composite material are preferable to be silicon carbide. Because it is a material having a high thermal conductivity.

Further, in the invention, it is preferable that the crystalline silicon bonding ceramic particles for the composite material to each other is very high in the crystallinity. Concretely, it is preferable that a half-width value of Si peak (2θ=about 28°) in an X-ray diffraction of the honeycomb structural body is not more than 0.6°.

The inventors have found that the thermal conductivity of the honeycomb structural body made of the porous ceramic formed by bonding ceramic particles through silicon is largely related to the crystallinity of silicon and the thermal conductivity of the resulting honeycomb structural body is largely changed in accordance with the crystallinity of silicon.

That is, the crystallinity of silicon bonding the ceramic particles is enhanced to an extent that the half-width value of Si peak (2θ=about 28°) in the X-ray diffraction of the honeycomb structural body is not more than 0.6°, whereby the thermal conductivity of the honeycomb structural body is made very excellent. As a result, the thermal diffusion property of the honeycomb structural body is improved, and even if the temperature distribution is generated in the honeycomb structural body or if the cold-heat cycle is repeated, the storing of thermal stress is less and the resistance to thermal shock is excellent.

Such a crystalline silicon can be prepared by selecting silicon having a higher crystallinity among starting materials and firing under a high temperature firing condition.

Moreover, it is considered that the conventional honeycomb structural bodies described in JP-A-2002-60279 and JP-A-2002-154876 is not sufficiently high in the thermal conductivity and insufficient in the resistance to thermal shock due to the low crystallinity of the metallic silicon because the half-width value of Si peak in the X-ray diffraction of the conventional honeycomb structural body (2θ=about 28°) exceeds 0.6° and the crystallinity is somewhat low.

That is, when the half-width value of Si peak in the X-ray diffraction of the honeycomb structural body (2θ=about 28°) exceeds 0.6°, the crystallinity of the crystalline silicon becomes low, and hence the thermal conductivity of the honeycomb structural body using such a crystalline silicon becomes not sufficiently high and the resistance to thermal shock thereof becomes insufficient.

In the invention, it is preferable that the half-width value of Si peak (2θ=about 28°) in the X-ray diffraction of the honeycomb structural body is not less than 0.1°.

Because, it is considered that when it is less than 0.1°, the crystallinity of the crystalline silicon is too high and the bonding stability of silicon itself becomes high. As a result, it is considered that when the cool-heat cycle (thermal shock) is repeatedly applied to the honeycomb structural body, if fine crack is created at the interface between the ceramic particle and the crystalline silicon, the crack is apt to be peeled off from the interface from a viewpoint of the bonding stability of silicon and grow into a large crack.

The inventors have found that the change in the storing degree of ash in the filter is observed by the relation of the crystallinity.

The term "ash" used herein means an inorganic compound produced from an engine oil, a fuel additive or the like, for example, phosphate containing calcium, magnesium or the like (calcium phosphate, magnesium phosphate or the like), sulfate (calcium sulfate, magnesium sulfate or the like), iron oxide, cerium oxide or the like. When such an inorganic compound is stored on the surfaces of the partition walls in the filter or reacted therewith, fine pores of the filter are clogged to increase the resistance to filtration. Particularly, when the ceramic particles are bonded through silicon, if the reaction is caused at the bonded places, the fine pores are liable to be more clogged.

Therefore, it is preferable that the peeling is easily caused. As the crystallinity is made high, it is considered that even if the inorganic compound such as ash contacts with the surface, the reaction at the interface hardly occurs and the ash is liable to be peeled.

However, it is considered that when the crystallinity is high, the bonding state of silicon itself is deteriorated by the peeling at the interface and the growth of crack accompanied therewith and it is difficult to prevent the reactivity to the ash.

BRIEF DESCRIPTION OF THE DRAWINGS

FIG. 1 is a diagrammatically perspective view showing an embodiment of the honeycomb structural body according to the invention.

FIG. 2b is a section view at A-A line of the porous ceramic member shown in FIG. 2a.

FIG. 3b is a section view at B-B line of the honeycomb structural body shown in FIG. 3a.

BEST MODE FOR CARRYING OUT THE INVENTION

Figure 2A:
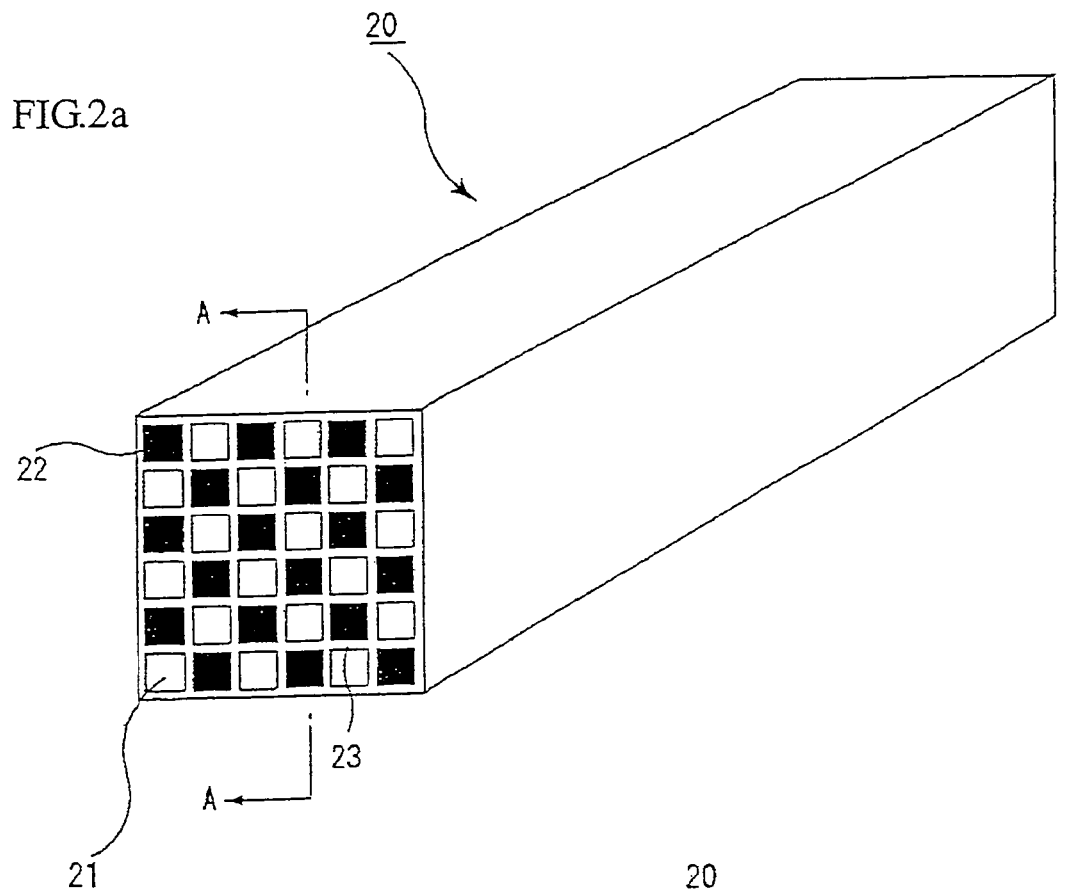
FIG. 2a is a diagrammatically perspective view showing an embodiment of porous ceramic member constituting the honeycomb structural body shown in FIG. 1.
Figure 2B:
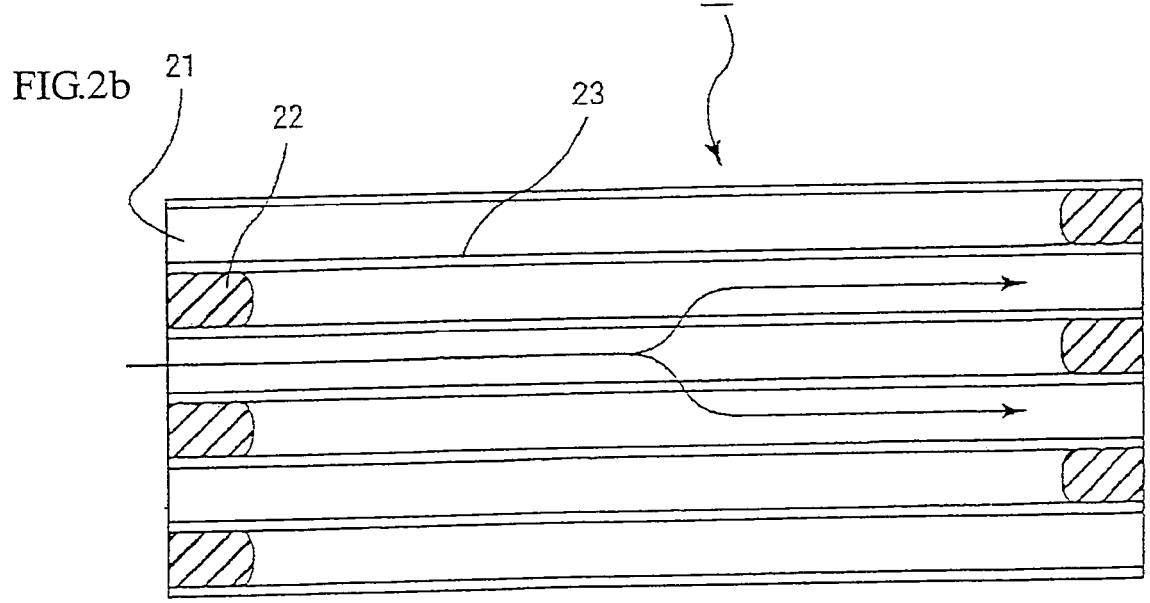

FIG. 1 is a diagrammatically perspective view showing a concrete example of an aggregate type honeycomb structural body as an embodiment of the honeycomb structural body according to the invention, and FIG. 2a is a diagrammatically perspective view showing an example of the porous ceramic member constituting the honeycomb structural body shown in FIG. 1, and FIG. 2b is a section view at a A-A line of the porous ceramic member shown in FIG. 2a.

As shown in FIGS. 1 and 2, in the honeycomb structural body 10 of the invention, a plurality of porous ceramic members 20 are bundled through sealing material layers 14 to constitute a columnar ceramic block 15, and a sealing material layer 13 is formed around the ceramic block 15.

In the prismatic porous ceramic member 20, many through-holes 21 are arranged side by side in the longitudinal direction through partition walls 23.

When the honeycomb structural body 10 according to the invention is used as a honeycomb filter for catching particulates in an exhaust gas, the porous ceramic member 20 is desirable to have a structure that either of end portions of the through-hole 21 is sealed with the sealing material 22 as shown in FIG. 2b.

That is, in the ceramic block 15 of the honeycomb structural body 10 of the invention, it is desirable that given through-holes 21 are sealed with the sealing materials (plugs) 22 at one end of the ceramic block 15, and through-holes 21 not sealed with the sealing materials (plugs) 22 are sealed with the sealing materials (plugs) 22 at the other end thereof.

In this case, the exhaust gas flowed into one through-hole 21 always passes through the partition wall 23 separating this through-hole 21 and then flows out from the other through-hole 21, so that the partition wall 23 separating these through-holes 21 from each other can serve as a filter for catching particulates.

Moreover, when the honeycomb structural body 10 of the invention is used as the above honeycomb filter, the sealing material layer 13 formed around the ceramic block 15 is formed for preventing the leakage of the exhaust gas from the outer periphery of the ceramic block 15. Therefore, it is not necessarily required in accordance with the application of the honeycomb structural body of the invention.

Figure 3A:
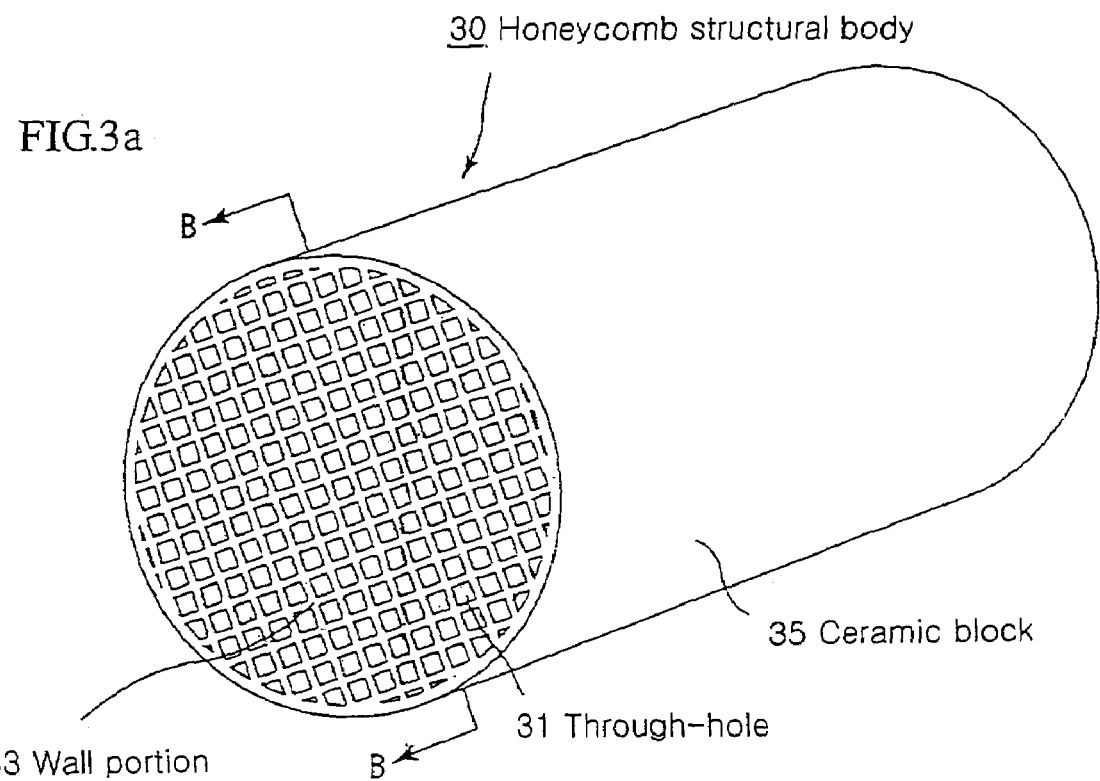
FIG. 3a is a diagrammatically perspective view showing another embodiment of the honeycomb structural body according to the invention.
Figure 3B:
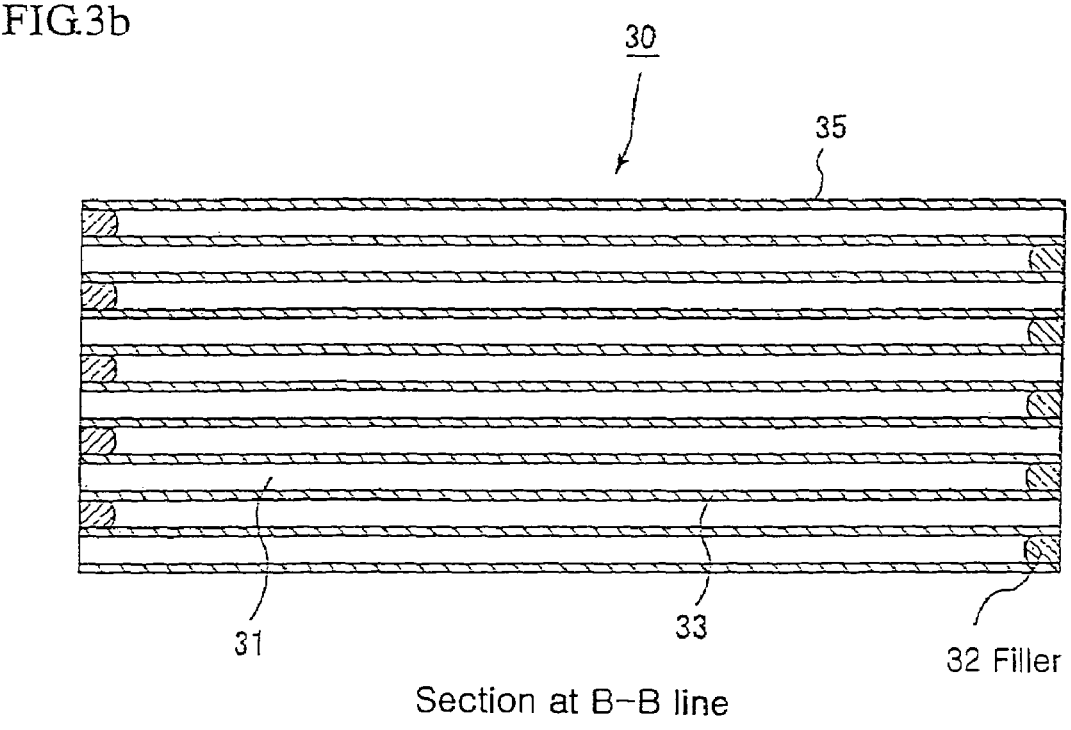

Also, FIG. 3a is a diagrammatically perspective view showing a concrete example of a one-piece type honeycomb structural body as another embodiment of the honeycomb structural body of the invention, and FIG. 3b is a section view at B-B line thereof.

As shown in FIG. 3a, the honeycomb structural body 30 of the invention is constituted with a columnar ceramic block 35 of porous ceramic in which a plurality of through-holes 31 are arranged side by side in a longitudinal direction through partition walls 33.

Also, when the honeycomb structural body 30 of the invention is used as a honeycomb filter for catching particulates in the exhaust gas, as shown in FIG. 3b, it is desirable that either end portions of the through-holes 31 in the ceramic block 35 are sealed with the sealing materials (plugs) 32.

That is, in the ceramic block 35 of the honeycomb structural body 30 of the invention, it is desirable that given through-holes 31 are sealed with the sealing materials (plugs) 32 at one end of the ceramic block 35, and through-holes 31 not sealed with the sealing materials (plugs) 32 are sealed with the sealing materials (plugs) 32 at the other end thereof.

In this case, the exhaust gas flowed into one through-hole 31 always passes through the partition wall 33 separating this through-hole 31 and then flows out from the other through-hole 31, so that the partition wall 33 separating these through-holes 31 from each other can serve as a filter for catching particulates.

Although there is not shown in FIG. 3, the sealing material layer may be formed around the ceramic block 35 likewise the honeycomb structural body 10 shown in FIG. 1.

In the honeycomb structural body according to the invention, the ceramic block is preferable to be made of the porous ceramic formed by bonding the ceramic particles through silicon.

As the ceramic particle are mentioned oxide ceramic such as cordierite, alumina, silica, mullite, zirconia, yttria or the like; carbide ceramic such as silicon carbide, zirconium carbide, titanium carbide, tantalum carbide, tungsten carbide or the like; nitride ceramic such as aluminum nitride, silicon nitride, boron nitride, titanium nitride or the like; and so on.

When the honeycomb structural body according to the invention is an aggregate type honeycomb structural body as shown in FIG. 1, silicon nitride being high in the heat resistance, excellent in the mechanical properties and chemical stability and large in the thermal conductivity is preferable among the above ceramic particles.

Also, when the honeycomb structural body according to the invention is a one-piece type honeycomb structural body as shown in FIG. 3, the oxide such as cordierite or the like is used. It can be produced cheaply and is relatively small in the thermal expansion coefficient and is not broken in the course of the use of honeycomb structural body of the invention as the honeycomb filter and not oxidized.

The thermal conductivity of the honeycomb structural body according to the invention is determined by the crystallinity of the crystalline silicon, kind of the ceramic particle used and the like, but when carbide ceramic or nitride ceramic is used as the ceramic particles, the thermal conductivity is desirably 3-60 W/m·k, more desirably 10-40 W/m·k.

When the thermal conductivity is less than 3 W/m·k, the thermal conduction is poor and the temperature gradient is liable to be easily caused in the longitudinal direction and the crack is apt to be easily caused.

While, when it exceeds 60 W/m·k, the thermal conduction is good, but the diffusion of heat becomes large and the temperature hardly rises. Also, the cooling is apt to be easily caused at an outlet side of heat to cause the temperature gradient at an end portion of the outlet side and hence crack is easily caused.

When oxide ceramic (e.g. cordierite) is used as the ceramic particles, the thermal conductivity is desirably 0.1-10 W/m·k, more desirably 0.3-3 W/m·k.

When the thermal conductivity is less than 0.1 W/m·k, the thermal conduction is poor and the temperature gradient is liable to be easily caused in the longitudinal direction and the crack is apt to be easily caused.

While, when it exceeds 10 W/m·k, the thermal conduction is good, but the diffusion of heat becomes large and the temperature hardly rises. Also, the cooling is apt to be easily caused at an outlet side of heat to cause the temperature gradient at an end portion of the outlet side and hence crack is easily caused.

In the honeycomb structural body shown in FIGS. 1 and 3, the form of the ceramic block is a cylinder. In the invention, the ceramic block is not limited to the cylinder if it is a column, and may be ellipsoidal column, rectangular column or the like.

Also, the porosity of the ceramic block is preferable to be about 20-80%. When the porosity is less than 20%, if the honeycomb structural body of the invention is used as the above honeycomb filter, the clogging may be rapidly caused, while when the porosity exceeds 80%, the strength of the ceramic block lowers and may be easily broken.

Moreover, the porosity can be measured by the conventionally known method such as mercury forcing process, Archimedes process, measurement through scanning type electron microscope(SEM) or the like.

Furthermore, the average pore size of the ceramic block is preferable to be about 5-100 µm. When the average pore size is less than 5 µm, if the honeycomb structural body of the invention is used as the honeycomb filter, the particulates may easily cause the clogging, while when the average pore size exceeds 100 µm, the particulates pass through the pores and the particulates can not be caught and the function as the filter can not be developed.

It is preferable that the particle size of the ceramic particles used in the production of the ceramic block is less in the shrinkage at the subsequent firing step. For example, it is preferable to combine 100 parts by weight of powder having an average particle size of about 0.3-50 µm with 5-65 parts by weight of powder having an average particle size of about 0.1-1.0 µm.

By mixing powders of ceramic particles having the above particle sizes in the above mixing ratio can be advantageously produced the ceramic block made of porous ceramic.

In the honeycomb structural body according to the invention, when either end portion of the through-holes in the ceramic block is filled with the sealing material (plug), it is desirable that the sealing material (plug) is made of the porous ceramic. Since the ceramic block filled with the sealing material (plug) is made of the porous ceramic, when the sealing material (plug) is made of the same porous ceramic as in the ceramic block, the adhesion strength between both can be enhanced, while by adjusting the porosity of the sealing material (plug) to the same as in the ceramic block can be attained the matching between the thermal expansion coefficient of the ceramic block and the thermal expansion coefficient of the sealing material (plug), whereby there can be prevented the formation of gaps between the sealing material (plug) and the wall portion through heat stress in the production or the use, the occurrence of cracks in the sealing material (plug) or the wall portion contacting with the sealing material (plug).

When the sealing material (plug) is made of the porous ceramic, the same material as the ceramic particles or crystalline silicon constituting the ceramic block is used.

When the honeycomb structural body according to the invention is an aggregate type honeycomb structural body shown in FIG. 1, the sealing material layers 13, 14 are formed between the porous ceramic members 20 and on the outer periphery of the ceramic block 15. The sealing material layer 14 formed between the porous ceramic members 20 functions as an adhesive bonding plural porous ceramic members 20 with each other, while the sealing material layer 13 formed on the outer periphery of the ceramic block 15 functions as a adhesive material for preventing leakage of the exhaust gas from the outer periphery of the ceramic block 15 when the honeycomb structural body according to the invention is used as a honeycomb filter and when the honeycomb structural body 10 of the invention is disposed in an exhaust path of an internal-combustion engine.

As the material constituting the sealing material layer, there can be used an inorganic binder, an organic binder, inorganic fibers and/or inorganic particles and the like.

Moreover, the sealing material layers in the honeycomb structural body according to the invention are formed between the porous ceramic members and on the outer periphery of the ceramic block as previously mentioned, but these sealing material layers may be made of the same material or may be made of different materials. Further, when the sealing material layers are made of the same material, the compounding ratio of the materials may be the same or different.

As the inorganic binder constituting the sealing material layer can be used, for example, silica sol, alumina sol and the like. They may be used alone or in a combination of two or more. Among the above inorganic binders, silica sol is desirable.

As the organic binder constituting the sealing material layer can be used, for example, polyvinyl alcohol, methyl cellulose, ethyl cellulose, carboxymethyl cellulose and the like. They may be used alone or in a combination of two or more. Among the above organic binders, carboxymethyl cellulose is desirable.

As the inorganic fibers constituting the sealing material layer can be used, for example, ceramic fibers made of silica-alumina, mullite, alumina, silica or the like. They may be used alone or in a combination of two or more. Among the above inorganic fibers, silica-alumina fibers are desirable.

As the inorganic particles constituting the sealing material layer can be used, for example, carbide, nitride and the like. Concretely, inorganic powder, whisker or the like made of silicon carbide, silicon nitride, boron nitride or the like can be used. They may be used alone or in a combination of two or more. Among the above inorganic particles, silicon carbide having an excellent thermal conduction is desirable.

The sealing material layer 14 may be made of a compact body or a porous body capable of flowing the exhaust gas into the inside thereof when the honeycomb structural body of the invention is used as the honeycomb filter, while the sealing material layer 13 is desirable to be made of a compact body. Because, when the honeycomb structural body 10 of the invention is disposed in the exhaust path of the internal-combustion engine, the sealing material layer 13 is formed so as to prevent the leakage of the exhaust gas from the outer periphery of the ceramic block 15.

In the honeycomb structural body according to the invention, as described with reference to FIGS. 1-3, given through-holes in either end portion of the ceramic block constituting the honeycomb structural body are filled and clogged with the sealing material (plug), so that it can be preferably used as a honeycomb filter for the purification of the exhaust gas catching particulates in the exhaust gas discharged from the internal-combustion engine such as diesel engine or the like.

When the honeycomb structural body according to the invention is used as a honeycomb filter for the purification of the exhaust gas, a catalyst such as Pt or the like for promoting the combustion of the particulate in the regeneration treatment of the honeycomb filter may be carried on the wall portions of the ceramic block.

Also, a noble metal such as Pt, Rh, Pd or the like, or an alloy thereof as a catalyst is carried on the ceramic block of the honeycomb structural body according to the invention, whereby the honeycomb structural body of the invention can be used as a catalyst carrier for conducting the purification of HC, CO, NOx and the like in the exhaust gas discharged from a thermal engine such as internal-combustion engine or the like or a combustion device such a boiler or the like, or reformulation of a liquid fuel or a gas fuel, and the like.

Moreover, when the honeycomb structural body according to the invention is used as the above catalyst carrier, the sealing material (plug) is not necessarily required.

As mentioned above, the honeycomb structural body according to the invention is constructed so as to include the ceramic block. This ceramic block is made of the porous ceramic formed by bonding ceramic particles through crystalline silicon.

Moreover, positions of silicon and ceramic can be confirmed, for example, by a reflection electron image of SEM or by mapping through EDS, or the like.

The crystalline silicon is very high in the crystallinity and has a half-width value of Si peak ($2\theta$=about $28°$) of not more than $0.6°$ through X-ray diffraction (it is desirable to measure according to JIS K0131-1996), so that the honeycomb structural body of the invention using such a crystalline silicon is very excellent in the thermal conductivity. As a result, in the honeycomb structural body of the invention, the thermal diffusibility is improved, and even if the temperature distribution is caused in the honeycomb structural body or the cool-heat cycle is repeated, the storing of heat stress is less and no crack is easily caused and the resistance to thermal shock is excellent.

Next, as an example of the production method of the honeycomb structural body according to the invention, there is explained a case that one ends of the given through-holes in the ceramic block are filled with the sealing material (plug) to produce a honeycomb structural body of a clogged state.

When the honeycomb structural body according to the invention is a one-piece type honeycomb structural body in which the structure is formed as one ceramic block as a whole as shown in FIG. 3, a starting paste composed mainly of ceramic particles and crystalline silicon powder as mentioned above is first shaped by extrusion to prepare a ceramic shaped body having substantially the same form as the honeycomb structural body 30 shown in FIG. 3.

In the starting paste, it is desired that the porosity of the ceramic block after the production is 20-80%. There is mentioned, for example, a case that the binder and the dispersing medium are added to the mixed powder of ceramic particles and silicon powder.

In case of producing the honeycomb structural body made of the porous ceramic by bonding the ceramic particles through the crystalline silicon as in the invention, the silicon powder is preferable to be used by pulverizing silicon having a high crystallinity such as single crystal silicon.

The silicon powder is fused in the heating treatment after the degreasing treatment as mentioned later to wet the surfaces of the ceramic particles and plays a role as a binding agent bonding the ceramic particles with each other. The compounding amount of such a silicon varies in accordance with the particle size, form and the like of the ceramic particle, but is desired to be 5-50 parts by weight per 100 parts by weight of the mixed powder.

When the amount is less than 5 parts by weight, the compounding amount of silicon powder is too small and the sufficient function as a binding agent of bonding the ceramic particles to each other can not be developed, and hence the strength of the resulting honeycomb structural body (ceramic block) may become insufficient. While, when it exceeds 50 parts by weight, the resulting honeycomb structural body is too densified to lower the porosity. For example, when the honeycomb structural body of the invention is used as a honeycomb filter for the purification of the exhaust gas, the pressure loss in the catching of the particulates becomes rapidly high and there is a fear that the function as the filter can not be sufficiently developed.

As the binder are mentioned, for example, methyl cellulose, carboxymethyl cellulose, hydroxyethyl cellulose, polyethylene glycol, phenol resin, epoxy resin and the like.

As the dispersing medium are mentioned, for example, organic solvents such as benzene and the like, alcohols such as methanol and the like, water and so on. This dispersing medium is compounded so as to make the viscosity of the starting paste within a given range.

The mixed powder of the ceramic particles and silicon powder, the binder and the dispersing medium are mixed through an attriter or the like and sufficiently milled in a kneader or the like to form the starting paste. Thereafter, the starting paste is extrusion-shaped to prepare the ceramic shaped body.

Also, the starting paste may be added with a shaping assistant, if necessary. As the shaping assistant is used, for example, ethylene glycol, dextrin, fatty acid soap, polyvinyl alcohol or the like.

Further, the starting paste may be added with balloons made of a micro-hollow spherical body of oxide ceramic, spherical acrylic particles, hole-forming agent such as graphite or the like, if necessary.

As the balloon is used, for example, alumina balloon, glass microballoon, silas balloon, fly ash balloon (FA balloon), mullite balloon and the like. Among the above balloon, fly ash balloon is desiable.

The ceramic shaped body is dried by using a microwave drier, a hot air drier, a dielectric drier, a pressure-reduced drier, a vacuum drier, a freezing drier or the like to form a ceramic dried body, which is then subjected to a sealing treatment by filling a paste as a sealing material (plug) into one ends of the given through-holes to seal these through-holes.

Figure 4A:
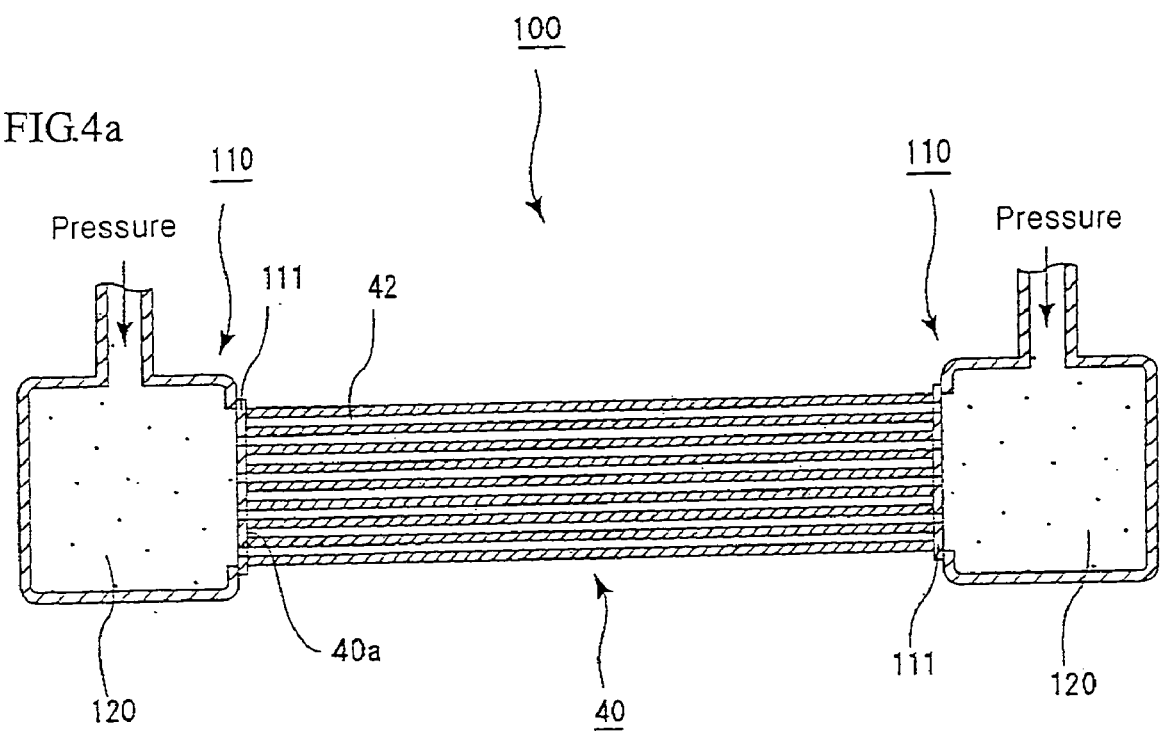
FIG. 4a is a diagrammatically section view illustrating a sealing treatment in the production of the honeycomb structural body according to the invention.
Figure 4B:
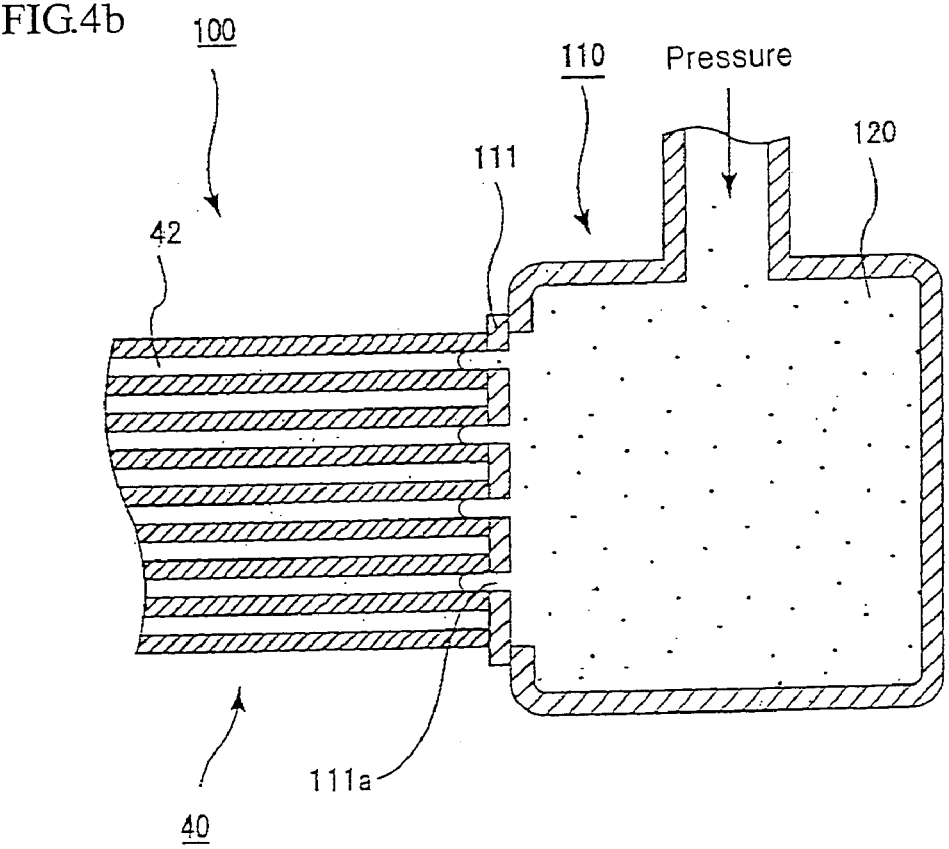
FIG. 4b is a partially enlarged section view thereof.

FIG. 4a is a diagrammatically section view illustrating an example of a sealing device used in the sealing treatment, and FIG. 4b is a partially enlarged section view of a part thereof.

As shown in FIG. 4, in the sealing device 100 used in the sealing treatment, two sets of closed-type sealing material discharging tanks 110 each provided at its side face with a mask 111 having opening portions 111a formed into a given pattern and filled at its inside with a sealing material paste 120 are arranged so as to oppose the side faces having the masks 111 to each other.

When the sealing treatment of the ceramic dried body is carried out by using the sealing device 100, the ceramic dried body 40 is first fixed between the sealing material discharging tanks 110 so as to contact an end face 40a of the ceramic dried body 40 with the mask 111 formed on the side face of the sealing material discharging tank 110.

In this case, the opening portion 111a of the mask 111 is a position relation of opposing to the respective through-hole 42 of the ceramic dried body 40.

Subsequently, a constant pressure is applied to the sealing material discharging device 110 by using a pump such as mono-pump or the like, whereby the sealing material paste 120 is discharged from the opening portion 111a of the mask 111 to penetrate the sealing material paste 120 into the end portions of the through-holes 42 in the ceramic dried body 40 and the paste 120 as the sealing material can be filled into the given through-holes 42 of the ceramic dried body 40.

Moreover, the sealing device used in the above sealing treatment is not limited to the aforementioned sealing device 100. For example, there may be a system provided with an open type sealing material discharging device having an agitation blade in its inside wherein the agitation blade is moved in up-down directions to flow the paste filled in the sealing material discharging device for the filling of the sealing material paste.

As the sealing material paste can be used the same as the starting paste, but it is desirable to add a lubricant, a solvent, a dispersing agent and a binder to the mixed powder used in the starting paste. Because they can prevent the settling of the ceramic particles in the sealing material paste on the way of the sealing treatment.

Then, the ceramic dried body filled with the sealing material paste is heated to about 150-700° C. to remove the binder included in the ceramic dried body, whereby it is subjected to a degreasing treatment to obtain a ceramic degreased body.

The degreasing treatment is desirable to be conducted at a temperature lower than a temperature fusing silicon. Also, the degreasing atmosphere may be an oxidizing atmosphere or an inert gas atmosphere such as nitrogen, argon or the like.

Moreover, as the degreasing atmosphere, an optimum atmosphere is selected considering the amount of the binder used, the kind of the ceramic particle and the like.

Next, the ceramic degreased body is heated to about 1400-1600° C. to soften (fuse) the silicon powder to produce a porous ceramic body formed by bonding the ceramic particles through this silicon.

Moreover, the half-width value of Si peak ($2\theta$=about 28°) of the porous ceramic body in the X-ray diffraction is more than 0.6° and the crystallinity thereof is low.

Further, the porous ceramic body is heated to about 1800-2100° C. to crystallize the silicon bonding the ceramic particles to form crystalline silicon, whereby there can be produced the honeycomb structural body (ceramic block) of the invention comprised of porous ceramic and formed into a ceramic block as a whole.

Moreover, the half-width value of Si peak ($2\theta$=about 28°) of the thus produced honeycomb structural body in the X-ray diffraction is not more than 0.6°, and the crystallinity thereof becomes very high.

In case of producing the honeycomb structural body formed by bonding the ceramic particles through silicon having such a low crystallinity that the half-width value of Si peak in the X-ray diffraction is more than 0.6°, it is preferable to take a method wherein a low crystallinity silicon such as amorphous silicon is used as the silicon powder and heated within a temperature range of 1400-1600° C. to bond the ceramic particles through the silicon.

The thus produced honeycomb structural body of the invention has a structure that one ends of the given through-holes in the ceramic block are filled and sealed with the sealing material (plug), which can be preferably used as a honeycomb filter for the purification of the exhaust gas.

In this case, the catalyst such as Pt or the like for promoting the combustion of the particulates when the honeycomb filter is subjected to a regeneration treatment may be carried on the wall portions of the ceramic block.

When the honeycomb structural body of the invention is used as a catalyst carrier for conducting the purification of HC, CO, NOx and the like in the exhaust gas discharged from a heat engine such as an internal-combustion engine or the like, or a combustion device such as a boiler or the like or the quality modification of a liquid fuel or a gas fuel, a noble metal such as Pt, Rh, Pd or the like or an alloy thereof as a catalyst may be carried on the wall portions of the ceramic block. In this case, the sealing treatment filling the sealing material (plug) is not necessarily required.

When the honeycomb structural body according to the invention is an aggregate type honeycomb structural body having a structure as shown in FIG. 1 that a plurality of porous ceramic members are bundled through the sealing material layers, the extrusion shaping is first carried out by using the starting paste composed mainly of the ceramic particles and silicon to prepare a green shaped body having a form of a porous ceramic member 20 as shown in FIG. 2.

Moreover, as the starting paste can be used the same starting paste as described in the aforementioned one-piece type honeycomb structural body.

Next, the green shaped body is dried by using a microwave drier or the like to obtain a dried body, which is subjected to a sealing treatment wherein one ends of the given through-holes of the dried body are filled with the sealing material paste as a sealing material (plug) to clog these through-holes.

Moreover, as the sealing material paste can be used the same sealing material paste as described in the aforementioned one-piece type honeycomb structural body. The sealing treatment differs in the target to be filled with the sealing material paste, but can use the same method as described in the above one-piece type honeycomb structural body.

Then, the dried body subjected to the above sealing treatment is subjected to a degreasing treatment under the same conditions as in the above one-piece type honeycomb structural body to produce a porous ceramic body, which is heated and fired under the same conditions as in the above one-piece type honeycomb structural body, whereby there can be produced a porous ceramic member in which a plurality of through-holes are arranged side by side through partition walls in a longitudinal direction.

Figure 5:
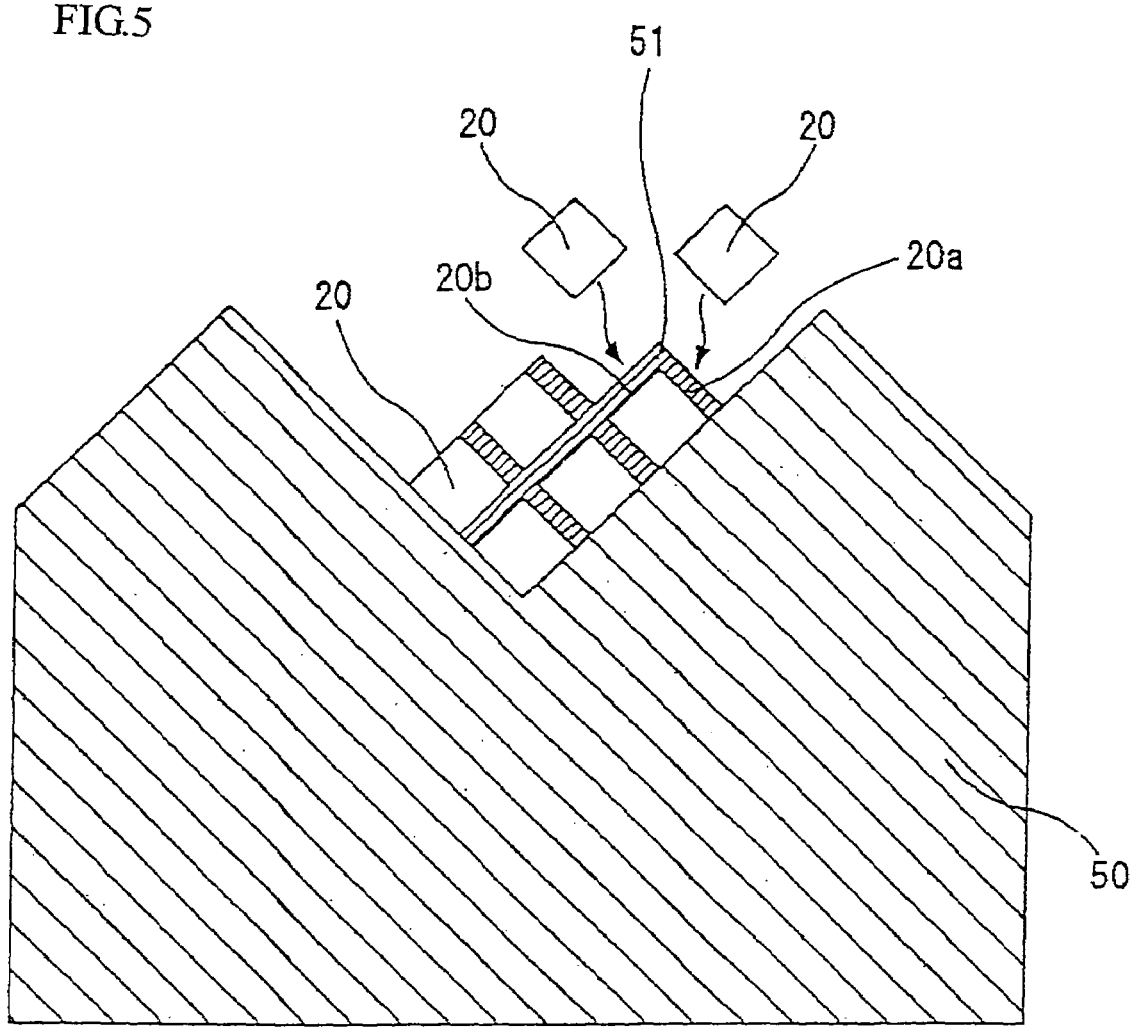
FIG. 5 is a diagrammatically side view illustrating the production of the honeycomb structural body according to the invention.

As shown in FIG. 5, the porous ceramic member 20 is placed on a base 50 having a V-shaped section at its upper part at an inclined state so that the porous ceramic members 20 can be laminated at a slantly inclined state, and thereafter the sealing material paste forming a sealing material layer 14 is applied to two upper side faces 20a, 20b at a uniform thickness to form a sealing material paste layer 51, and the other porous ceramic member 20 is subsequently piled on the sealing material paste layer 51, and these steps are repeated to prepare a laminate of the prismatic porous ceramic members 20 having a given size.

Moreover, the material constituting the sealing material paste layer is previously described in the explanation of the honeycomb structural body according to the invention, so that the explanation thereof is omitted here.

The laminate of the porous ceramic members 20 is heated to dry and solidify the sealing material paste layer 51 to form the sealing material layer 14, and thereafter the outer peripheral portion of the laminate is cut by using a diamond cutter or the like into a form as shown in FIG. 1 to prepare the ceramic block 15.

Further, the sealing material layer 13 is formed on the outer periphery of the ceramic block 15 by using the above sealing material paste, whereby there can be produced the honeycomb structural body according to the invention constituted by bundling plural porous ceramic members through the sealing material layers.

The thus produced honeycomb structural body according to the invention can be preferably used as a honeycomb filter for the purification of the exhaust gas because the one ends of the given through-holes in the ceramic block (porous ceramic members) are filled and clogged with the sealing material (plug). In this case, the wall portions of the ceramic block (partition walls of the porous ceramic members) may be carried with a catalyst such as Pt or the like for promoting the combustion of the particulates in the regeneration treatment of the honeycomb filter.

When the honeycomb structural body of the invention is used as a catalyst carrier for conducting the purification of HC, CO, NOx and the like in the exhaust gas discharged from a heat engine such as an internal-combustion engine or the like, or a combustion device such as a boiler or the like or the quality modification of a liquid fuel or a gas fuel, a noble metal such as Pt, Rh, Pd or the like or an alloy thereof as a catalyst may be carried on the wall portions of the ceramic block. In this case, the sealing treatment filling the sealing material (plug) is not necessarily required.

Then, the exhaust gas purification apparatus using the honeycomb structural body according to the invention will be described.

Figure 6:
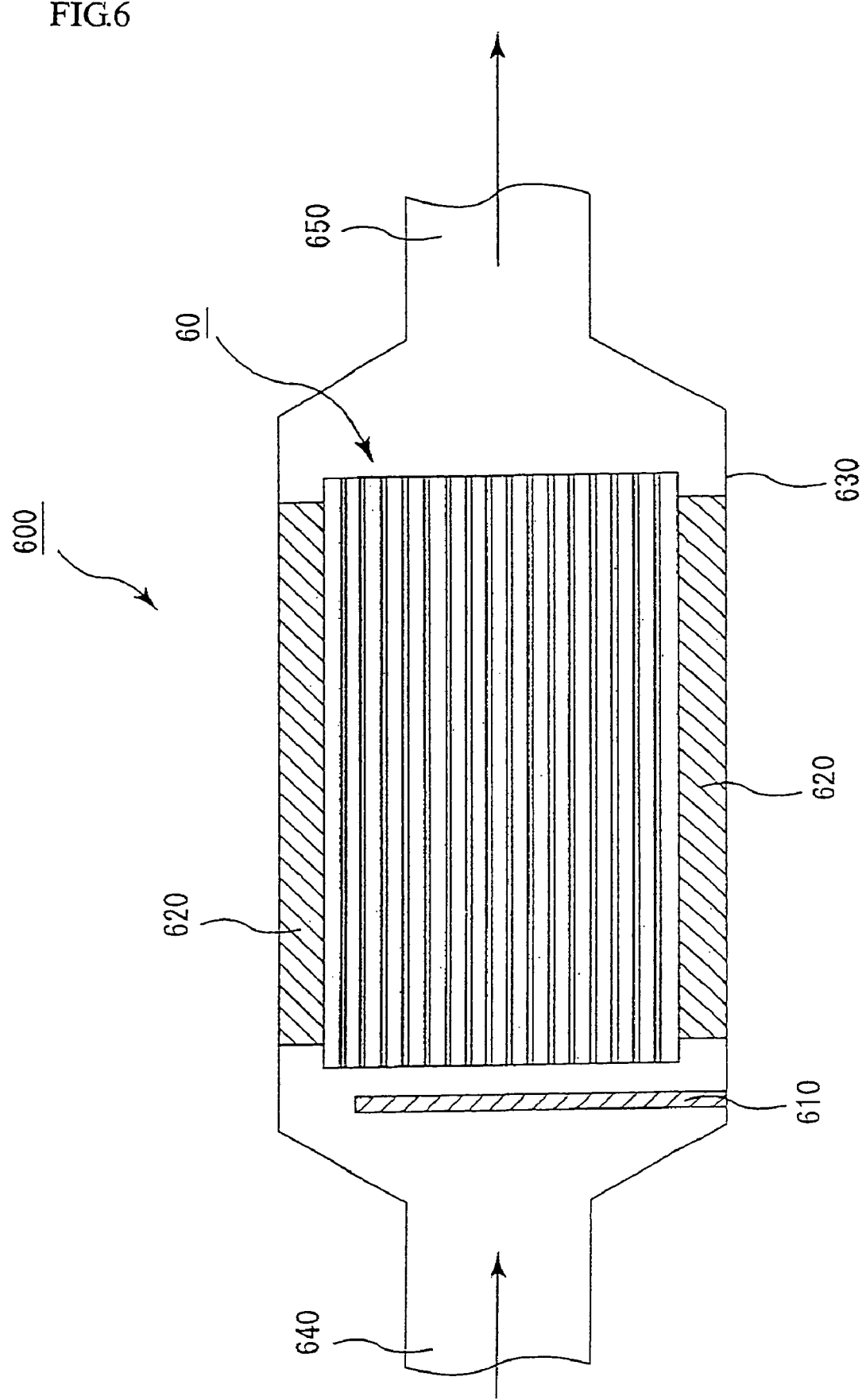
FIG. 6 is a diagrammatically section view of an embodiment of the exhaust gas purification apparatus using the honeycomb structural body according to the invention.

When the honeycomb structural body according to the invention is used as a honeycomb filter for the purification of the exhaust gas, it is desirable to arrange in an exhaust gas purification apparatus of a vehicle as shown in FIG. 6.

FIG. 6 is a diagrammatically section view illustrating an example of the exhaust gas purification apparatus of the vehicle arranging the honeycomb structural body according to the invention (honeycomb filter).

As shown in FIG. 6, the exhaust gas purification apparatus 600 is mainly constituted with a honeycomb filter 60 according to the invention, a casing 630 covering the outside of the honeycomb filter 60, a keep seal material 620 disposed between the honeycomb filter 60 and the casing 630, a heating means 610 arranged at an exhaust gas flowing side of the honeycomb filter 60.

To an end portion of the casing 630 introducing the exhaust gas is connected an inlet pipe 640 connected to an internal-combustion engine such as an engine or the like, and the other end portion of the casing 630 is connected with a discharge pipe 650 connected to an exterior. Moreover, an arrow in FIG. 6 shows a flow of the exhaust gas.

In FIG. 6, the structure of the honeycomb filter 60 may be the same as the honeycomb structural body 10 shown in FIG. 1 or the same as the honeycomb structural body 30 shown in FIG. 3.

In the exhaust gas purification apparatus 600 having such a construction, the exhaust gas discharged from the internal-combustion engine such as engine or the like is introduced into the casing 630 through the inlet pipe 640 and passed from the through-holes of the honeycomb filter 60 through the wall portions (partition walls) to conduct purification by catching particulates with the wall portions (partition walls) and then discharged through the discharge pipe 650 to an exterior.

As a greater amount of the particulates is stored on the wall portions (partition walls) of the honeycomb filter 60 to raise pressure loss, the regeneration treatment of the honeycomb filter 60 is conducted.

In the regeneration treatment, a gas heated by using the heating means 610 is flown into the inside of each through-hole of the honeycomb filter 60 to heat the honeycomb filter 60, where the particulates stored on the wall portions (partition walls) are combusted and removed by heating.

Also, the particulates can be combusted and removed by using a post injection system.

Furthermore, when the catalyst such as Pt or the like is carried on the wall portions (partition walls) of the honeycomb filter 60 for promoting the combustion of the particulates, the combustion temperature of the particulate is lowered, so that the heating temperature of the honeycomb filter 60 by the heating means 610 can be lowered, and the heating through the heating means 610 can be made useless, if necessary.

EXAMPLES

Example 1

(1) A starting paste is prepared by wet-mixing 80% by weight of α-type silicon carbide powder having an average particle size of 30 μm with 20% by weight of single crystal silicon powder having an average particle size of 4 μm (half-width value of Si peak (2θ=about 28°) in an X-ray diffraction measured by a method described later is 0.6°) and adding and kneading with 6 parts by weight of an organic binder (methyl cellulose), 2.5 parts by weight of a surfactant (oleic acid) and 24 parts by weight of water based on 100 parts by weight of the resulting mixed powder.

Then, the starting paste is filled in an extrusion shaping machine and shaped at an extruding rate of 10 cm/min to prepare a green shaped body having substantially the same form as a porous ceramic member 30 shown in FIG. 2.

The green shaped body is dried by using a microwave drier to form a ceramic dried body, a sealing material paste having the same composition as in the green shaped body is filled in one ends of given through-holes and again dried by using the drier and degreased in an oxidizing atmosphere at 550° C. for 3 hours to obtain a ceramic degreased body.

The ceramic degreased body is heated in an argon atmosphere at 1400° C. for 2 hours to fuse the single crystal silicon to thereby bond silicon carbide particles through silicon.

Thereafter, the silicon is crystallized by firing at 2150° C. under an argon atmosphere of an atmospheric pressure for 2 hours, whereby there is produced a porous ceramic member having a porosity of 45%, an average pore size of 10 μm and a size of 34.3 mm×34.3 mm×254 mm.

(2) The porous ceramic members are bundled by the method described with reference to FIG. 5 using a heat-resistant sealing material paste comprising 30% by weight of alumina fibers having a fiber length of 0.2 mm, 21% by weight of silicon carbide particles having an average particle size of 0.6 μm, 15% by weight of silica sol, 5.6% by weight of carboxymethyl cellulose and 28.4% by weight of water and then cut by using a diamond cutter to prepare a cylindrical ceramic block having a diameter of 165 mm.

In this case, the thickness of the sealing material layer bundling the porous ceramic members is adjusted to 1.0 mm.

Then, a sealing material paste is prepared by mixing and kneading 23.3% by weight of ceramic fibers comprised of alumina silicate as an inorganic fiber (shot content: 3%, fiber length: 0.1-100 mm), 30.2% by weight of silicon carbide powder having an average particle size of 0.3 μm as an inorganic particle, 7% by weight of silica sol as an inorganic binder ($SiO_2$ content in sol: 30% by weight), 0.5% by weight of carboxymethyl cellulose as an organic binder and 39% by weight of water.

The sealing material paste is used to form a sealing material paste layer having a thickness of 1.0 mm on an outer peripheral portion of the ceramic block. The sealing material paste layer is dried at 120° C. to produce a cylindrical honeycomb structural body functioning as a honeycomb filter for the purification of the exhaust gas.

Example 2

(1) A porous ceramic member is produced in the same manner as described in (1) of Example 1 except that the firing conditions after the bonding of the silicon carbide particles through silicon are 2200° C. and 2 hours.

(2) A honeycomb structural body functioning as a honeycomb filter for the purification of the exhaust gas is produced in the same manner as described in (2) of Example 1 except for the use of the porous ceramic member produced in the above (1).

Example 3

(1) A porous ceramic member is produced in the same manner as described in (1) of Example 1 except that the firing conditions after the bonding of the silicon carbide particles through silicon are 2200° C. and 3 hours.

(2) A honeycomb structural body functioning as a honeycomb filter for the purification of the exhaust gas is produced in the same manner as described in (2) of Example 1 except for the use of the porous ceramic member produced in the above (1).

Comparative Example 1

(1) A ceramic degreased body is prepared in the same manner as described in (1) of Example 1 except that amorphous silicon (half-width value of Si peak ($2\theta$=about 28° is 1.5°) is used instead of the single crystal silicon. The ceramic degreased body is heated at 1600° C. for 3 hours to fuse the amorphous silicon powder and bond the silicon carbide particles through silicon to produce a porous ceramic member.

(2) A honeycomb structural body functioning as a honeycomb filter for the purification of the exhaust gas is produced in the same manner as described in (2) of Example 1 except for the use of the porous ceramic member produced in the above (1).

Comparative Example 2

(1) A ceramic degreased body is prepared in the same manner as described in (1) of Example 1 except that amorphous silicon (half-width value of Si peak ($2\theta$=about 28° is 1.6°) is used instead of the single crystal silicon. The ceramic degreased body is heated at 1500° C. for 2 hours to fuse the amorphous silicon powder and bond the silicon carbide particles through silicon to produce a porous ceramic member.

(2) A honeycomb structural body functioning as a honeycomb filter for the purification of the exhaust gas is produced in the same manner as described in (2) of Example 1 except for the use of the porous ceramic member produced in the above (1).

Comparative Example 3

(1) A ceramic degreased body is prepared in the same manner as described in (1) of Example 1 except that metallic silicon (half-width value of Si peak ($2\theta$=about 28° is 0.9°) is used instead of the single crystal silicon. The ceramic degreased body is heated at 1600° C. for 3 hours to fuse the metallic silicon powder and bond the silicon carbide particles through silicon to produce a porous ceramic member.

(2) A honeycomb structural body functioning as a honeycomb filter for the purification of the exhaust gas is produced in the same manner as described in (2) of Example 1 except for the use of the porous ceramic member produced in the above (1).

Comparative Example 4

(1) A ceramic degreased body is prepared in the same manner as described in (1) of Example 1 except that metallic silicon (half-width value of Si peak ($2\theta$=about 28° is 0.9°) is used instead of the single crystal silicon. The ceramic degreased body is heated at 1500° C. for 2 hours to fuse the metallic silicon powder and bond the silicon carbide particles through silicon to produce a porous ceramic member.

(2) A honeycomb structural body functioning as a honeycomb filter for the purification of the exhaust gas is produced in the same manner as described in (2) of Example 1 except for the use of the porous ceramic member produced in the above (1).

Comparative Example 5

(1) A ceramic degreased body is prepared in the same manner as described in (1) of Example 1 except that metallic silicon (half-width value of Si peak ($2\theta$=about 28° is 0.6°) is used instead of the single crystal silicon. The ceramic degreased body is heated at 1500° C. for 2 hours to fuse the metallic silicon powder and bond the silicon carbide particles through silicon to produce a porous ceramic member.

(2) A honeycomb structural body functioning as a honeycomb filter for the purification of the exhaust gas is produced in the same manner as described in (2) of Example 1 except for the use of the porous ceramic member produced in the above (1).

Comparative Example 6

(1) A ceramic degreased body is prepared in the same manner as described in (1) of Example 1 except that metallic silicon (half-width value of Si peak ($2\theta$=about 28° is 0.6°) is used instead of the single crystal silicon. The ceramic degreased body is heated at 1800° C. for 2 hours to fuse the metallic silicon powder and bond the silicon carbide particles through silicon to produce a porous ceramic member.

(2) A honeycomb structural body functioning as a honeycomb filter for the purification of the exhaust gas is produced in the same manner as described in (2) of Example 1 except for the use of the porous ceramic member produced in the above (1).

Test Example 1

(1) A porous ceramic member is produced in the same manner as described in (1) of Example 1 except that the firing conditions after the bonding of the silicon carbide particles through silicon are 2250° C. and 3 hours.

(2) A honeycomb structural body functioning as a honeycomb filter for the purification of the exhaust gas is produced in the same manner as described in (2) of Example 1 except for the use of the porous ceramic member produced in the above (1).

Example 4

(1) A starting paste is prepared by wet-mixing 80% by weight of alumina powder having an average particle size of 30 µm with single crystal silicon powder having an average particle size of 4 µm (half-width value is 0.6°) and adding and kneading with 6 parts by weight of an organic binder (methyl cellulose), 2.5 parts by weight of a surfactant(oleic acid) and 24 parts by weight of water based on 100 parts by weight of the resulting mixed powder.

Then, the starting paste is filled in an extrusion shaping machine and shaped at an extrusion rate of 10 cm/min to prepare a green shaped body having substantially the same form as a porous ceramic member 30 shown in FIG. 3.

The green shaped body is dried by using a microwave drier to form a ceramic dried body, a sealing material paste having the same composition as in the green shaped body is filled in one ends of given through-holes and again dried by using the drier and degreased in an oxidizing atmosphere at 550° C. for 3 hours to obtain a ceramic degreased body.

The ceramic degreased body is heated in an argon atmosphere at 1400° C. for 2 hours to fuse the single crystal silicon to thereby bond silicon carbide particles through silicon.

Thereafter, the silicon is crystallized by firing at 2000° C. under an argon atmosphere of an atmospheric pressure for 1 hour, whereby there is produced a cylindrical porous ceramic member having a porosity of 45%, an average pore size of 10 μm and a size of 144 mm in diameter and 254 mm in length. This is rendered into a honeycomb structural body functioning as a honeycomb filter for the purification of the exhaust gas.

Example 5

(1) A porous ceramic member (honeycomb structural body) is produced in the same manner as described in (1) of Example 4 except that the firing conditions after the bonding of the alumina particles through silicon are 2010° C. and 2 hours.

Example 6

(1) A porous ceramic member (honeycomb structural body) is produced in the same manner as described in (1) of Example 4 except that the firing conditions after the bonding of the alumina particles through silicon are 2040° C. and 2 hours.

Comparative Example 7

(1) A ceramic degreased body is prepared in the same manner as described in Example 4 except that amorphous silicon (half-width value of Si peak (2θ=about 28° is 1.5°) is used instead of the single crystal silicon. The ceramic degreased body is heated at 1600° C. for 3 hours to fuse the amorphous silicon powder and bond the alumina particles through silicon to produce a porous ceramic member (honeycomb structural body).

Comparative Example 8

(1) A ceramic degreased body is prepared in the same manner as described in Example 4 except that amorphous silicon (half-width value of Si peak (2θ=about 28° is 1.6°) is used instead of the single crystal silicon. The ceramic degreased body is heated at 1500° C. for 2 hours to fuse the amorphous silicon powder and bond the alumina particles through silicon to produce a porous ceramic member (honeycomb structural body).

Comparative Example 9

(1) A ceramic degreased body is prepared in the same manner as described in (1) of Example 4 except that metallic silicon (half-width value of Si peak (2θ=about 28° is 0.9°) is used instead of the single crystal silicon. The ceramic degreased body is heated at 1600° C. for 3 hours to fuse the metallic silicon powder and bond the alumina particles through silicon to produce a porous ceramic member (honeycomb structural body).

Comparative Example 10

(1) A ceramic degreased body is prepared in the same manner as described in Example 4 except that metallic silicon (half-width value of Si peak (2θ=about 28° is 0.90) is used instead of the single crystal silicon. The ceramic degreased body is heated at 1500° C. for 2 hours to fuse the metallic silicon powder and bond the alumina particles through silicon to produce a porous ceramic member (honeycomb structural body).

Comparative Example 11

(1) A ceramic degreased body is prepared in the same manner as described in Example 4 except that metallic silicon (half-width value of Si peak (2θ=about 28° is 0.6°) is used instead of the single crystal silicon. The ceramic degreased body is heated at 1500° C. for 2 hours to fuse the metallic silicon powder and bond the alumina particles through silicon to produce a porous ceramic member (honeycomb structural body).

Comparative Example 12

(1) A ceramic degreased body is prepared in the same manner as described in Example 4 except that metallic silicon (half-width value of Si peak (2θ=about 28° is 0.6°) is used instead of the single crystal silicon. The ceramic degreased body is heated at 1800° C. for 2 hours to fuse the metallic silicon powder and bond the alumina particles through silicon to produce a porous ceramic member (honeycomb structural body).

Test Example 2

(1) A porous ceramic member (honeycomb structural body) is produced in the same manner as described in Example 4 except that the firing conditions after the bonding of the alumina particles through silicon are 2040° C. and 3 hours.

With respect to the honeycomb structural bodies of Examples 1-6, Comparative Examples 1-12 and Test Examples 1-2 are conducted the following evaluation tests (A)-(C).

(A) Evaluation Test for the Crystallinity of Silicon Bonding Silicon Carbide Particles A half-width value of Si peak (2θ=about 28°) in an X-ray diffraction is measured with respect to the honeycomb structural bodies of Examples 1-6, Comparative Examples 1-12 and Test Examples 1-2 (and silicon starting materials). The results are shown in Table 1.

As an X-ray diffraction device used in this analytical measurement is RIGAKU RINT-2500 made by Rigaku Denki Co., Ltd. A light source of an X-ray tube is CuKα1. As the measuring method, a sample is first pulverized and uniformized and then filled in a glass sample holder, and the sample holder filled with the sample is set on a sample base of a goniometer, and a power source of the apparatus is switched on while flowing a cooling water to the X-ray tube and a voltage is gradually raised to 40 kV and a current is set to 30 mA by turning a current adjusting knob. Thereafter, the measurement is conducted by setting various conditions.

Moreover, the measuring conditions of the X-ray diffraction are as follows. Divergence slit: 0.5°, divergence longitudinal restriction slit: 10 mm, diffusion slit: 0.5°, light receiving slit: 0.3 mm, monochromatic receiving slit: 0.8 mm, scanning mode: continuous, scanning rate: 5.000°/min, step: 0.01°, scanning range: 10.000°-60.000°, monochrometer: use of counter monochrometer, optical system: concentrated optical system.

(B) Evaluation Test for Resistance to Thermal Shock (1)

The honeycomb structural body according to Examples 1-6, Comparative Examples 1-12 and Test examples 1-2 is placed in an electric furnace and slowly heated to 800° C. at a temperature rising rate of 10° C./min and held at this temperature for 30 minutes and violently cooled to a lower temperature to generate a temperature distribution, whereby a temperature difference generating crack is visually measured.

Moreover, as the temperature difference is shown a highest temperature difference among measured values at a distance of 5 mm separated from an axial line (center axis) of the filter in an outward direction and in three places of 10 mm, 125 mm and 240 mm positioned from a one-side end face of the filter in the axial direction thereof (length: 254 mm).

The results are shown in Table 1.

(C) Evaluation Test for Resistance to Thermal Shock (2)

The honeycomb structural body according to Examples 1-6, Comparative Examples 1-12 and Test Examples 1-2 is placed in an exhaust gas purification device disposed in an exhaust path of an engine as shown in FIG. 6. The engine is operated at a revolution number of 3000 rpm under a torque of 50 Nm for a given time to catch particulates (8 g/L) and then the regeneration treatment is conducted, and such operations are repeated, during which the occurrence of crack in the honeycomb structural body is visually observed.

The results are shown in Table 1.

TABLE 1

| | Composition of composite material | Form of ceramic block | Half-width value of starting Si (°) | Firing temperature (° C.) | Heating time (hour) | Half-width value of fired body (°) | Test for resistance to thermal shock(1) (° C.) |
|---|---|---|---|---|---|---|---|
| Example 1 | SiC + Si | FIG. 1 | 0.6 | 2150 | 2 | 0.6 | 110 |
| Example 2 | SiC + Si | FIG. 1 | 0.6 | 2200 | 2 | 0.3 | 140 |
| Example 3 | SiC + Si | FIG. 1 | 0.6 | 2200 | 3 | 0.1 | 120 |
| Comparative Example 1 | SiC + Si | FIG. 1 | 1.5 | 1600 | 3 | 0.7 | 60 |
| Comparative Example 2 | SiC + Si | FIG. 1 | 1.6 | 1500 | 2 | 0.8 | 30 |
| Comparative Example 3 | SiC + Si | FIG. 1 | 0.9 | 1600 | 3 | 0.75 | 60 |
| Comparative Example 4 | SiC + Si | FIG. 1 | 0.9 | 1500 | 2 | 0.85 | 30 |
| Comparative Example 5 | SiC + Si | FIG. 1 | 0.6 | 1500 | 2 | 0.65 | 80 |
| Comparative Example 6 | SiC + Si | FIG. 1 | 0.6 | 1800 | 3 | 0.7 | 70 |
| Test example 1 | SiC + Si | FIG. 1 | 0.6 | 2250 | 2 | 0.05 | 110 |
| Example 4 | alumina + Si | FIG. 3 | 0.6 | 2000 | 1 | 0.6 | 90 |
| Example 5 | alumina + Si | FIG. 3 | 0.6 | 2010 | 2 | 0.3 | 95 |
| Example 6 | alumina + Si | FIG. 3 | 0.6 | 2040 | 2 | 0.1 | 93 |
| Comparative Example 7 | alumina + Si | FIG. 3 | 1.5 | 1600 | 3 | 0.7 | 55 |
| Comparative Example 8 | alumina + Si | FIG. 3 | 1.6 | 1500 | 2 | 0.8 | 55 |
| Comparative Example 9 | alumina + Si | FIG. 3 | 0.9 | 1600 | 3 | 0.75 | 73 |
| Comparative Example 10 | alumina + Si | FIG. 3 | 0.9 | 1500 | 2 | 0.85 | 24 |
| Comparative Example 11 | alumina + Si | FIG. 3 | 0.6 | 1500 | 2 | 0.65 | 65 |
| Comparative Example 12 | alumina + Si | FIG. 3 | 0.6 | 1800 | 3 | 0.7 | 70 |
| Test example 2 | alumina + Si | FIG. 3 | 0.6 | 2040 | 3 | 0.05 | 90 |

| | Test for resistance to thermal shock (2) | | Degree of ash stored | |
|---|---|---|---|---|
| | Presence or absence of crack after 5 repeats | Presence or absence of crack after 100 repeats | (thickness of 126 mm)/ (thickness of 240 mm) | Presence or absence of ash reactivity |
| Example 1 | absence | absence | 0.83 | absence |
| Example 2 | absence | absence | 0.93 | absence |
| Example 3 | absence | absence | 0.8 | absence |
| Comparative Example 1 | presence | presence | 0.6 | presence |
| Comparative Example 2 | presence | presence | 0.5 | presence |
| Comparative Example 3 | presence | presence | 0.7 | presence |
| Comparative Example 4 | presence | presence | 0.45 | presence |
| Comparative Example 5 | presence | presence | 0.72 | presence |
| Comparative Example 6 | presence | presence | 0.56 | presence |
| Test example 1 | absence | slightly presence | 0.75 | slightly presence |
| Example 4 | absence | absence | 0.8 | absence |
| Example 5 | absence | absence | 0.9 | absence |
| Example 6 | absence | absence | 0.77 | absence |
| Comparative Example 7 | presence | presence | 0.57 | presence |
| Comparative Example 8 | presence | presence | 0.48 | presence |
| Comparative Example 9 | presence | presence | 0.67 | presence |
| Comparative Example 10 | presence | presence | 0.43 | presence |
| Comparative Example 11 | presence | presence | 0.69 | presence |
| Comparative Example 12 | presence | presence | 0.53 | presence |
| Test example 2 | absence | slightly presence | 0.72 | slightly presence |

As seen from the results of Table 1, the half-width values of Si peak (2θ=about 28°) in the X-ray diffraction of the honeycomb structural bodies of the examples are 0.1-0.6°, which are not more than 0.6° and the crystallinity is high.

Figure 7:
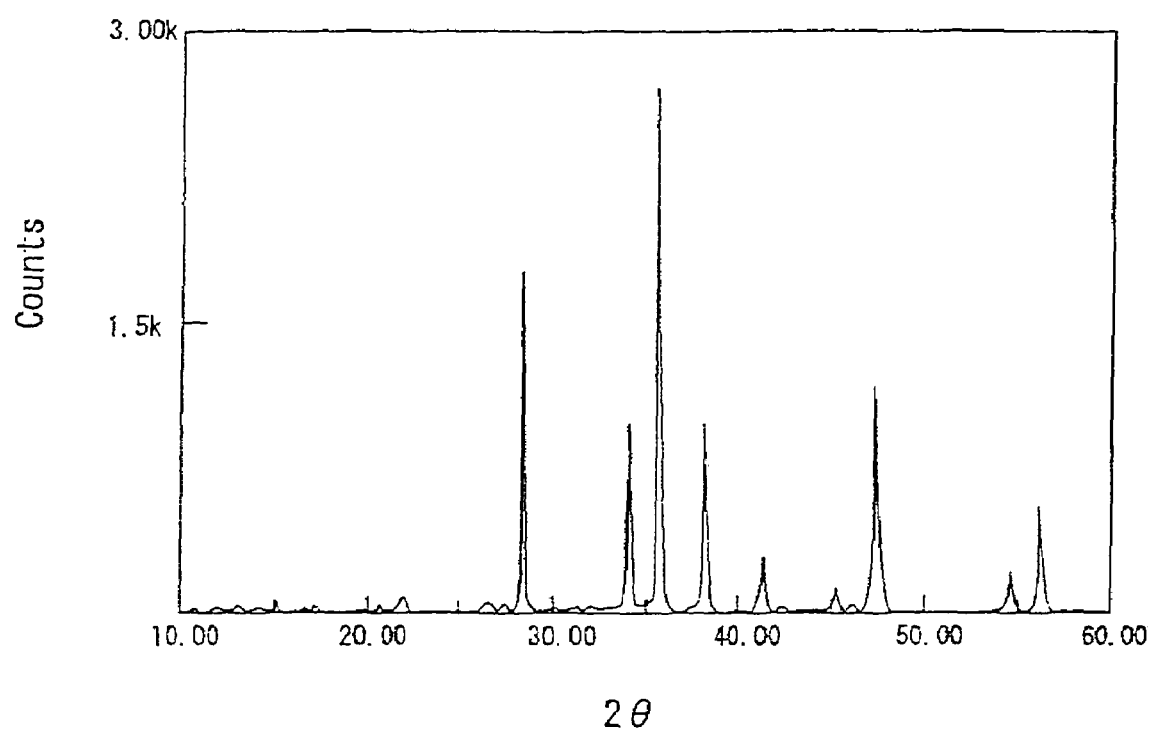
FIG. 7 is a graph showing an X-ray diffraction of the honeycomb structural body of Example 1.

Moreover, FIG. 7 shows a graph of X-ray diffraction of the honeycomb structural body of Example 1. As shown in FIG. 7, the half-width value of Si peak (2θ=about 28°) in the X-ray diffraction of the honeycomb structural body of Example 1 is 0.6°.

On the contrary, the half-width values of Si peak (2θ=about 28°) in the X-ray diffraction of the honeycomb structural bodies of the comparative examples are 0.7-0.85°, which are more than 0.6° and the crystallinity is somewhat low.

As shown in Comparative Examples 5 and 6, even if the ceramic and the metallic silicon are simply fired at a low temperature (1500-1800° C.), it is not necessarily said that the product having a low half-width value can be produced.

On the other hand, the half-width value of Si peak (2θ=about 28°) of the honeycomb structural body of Test Example 1 in the X-ray diffraction is 0.05° and the crystallinity thereof is very high.

As seen from the results of the test for the resistance to thermal shock (1), when the honeycomb structural bodies of the examples and the test examples are made from a composite material formed by bonding the silicon carbide particles through the crystalline silicon, the temperature difference causing the crack is 110-140° C., which is higher than 100° C. On the other hand, the temperature difference causing the crack in the honeycomb structural bodies of the comparative examples is 30-80° C.

Also, when the honeycomb structural bodies of the examples and the test examples are made from a composite material formed by bonding the alumina particles through the crystalline silicon, the temperature difference causing the crack is 90-95° C., which is higher than 90° C. On the other hand, the temperature difference causing the crack in the honeycomb structural bodies of the comparative examples is 24-73° C.

As seen from the results of the test for the resistance to thermal shock (2), the honeycomb structural bodies of the examples do not cause the crack even after the particulate catching and regeneration treatment are repeated 100 times. On the other hand, the crack is generated in the honeycomb structural bodies of the comparative examples at a time of repeating the particulate catching and the regeneration treatment 5 times. Also, the honeycomb structural body of Test Example 1 does not cause the crack at a time of repeating the particulate catching and the regeneration treatment 5 times, but causes the crack at a time of 100 repeats.

From the results of the tests for the resistance to thermal shock (1) and (2), it has been confirmed that the honeycomb structural bodies of the examples are very excellent in the resistance to thermal shock but the honeycomb structural bodies of the comparative examples are poor in the resistance to thermal shock.

Further, from the results of Test Example 1, it has been found that when the crystallinity of silicon bonding the silicon carbide particles is very high as less than 0.1°, the crack resulted from the temperature difference hardly occurs as seen from the result of the test for the resistance to thermal shock (1), but the resistance to thermal shock against the cool-heat cycles is poorer that those of the honeycomb structural bodies of the examples as seen from the results of the test for the resistance to thermal shock (2).

(D) Regeneration Test of Exhaust Gas Purification Apparatus (Test of Storing Ash)

The honeycomb structural bodies of Examples 1-4 and Comparative Examples 1-6 are used as a honeycomb filter in the exhaust gas purification apparatus, and the cycle test repeating the particulate catching and the regeneration treatment is carried out under the same conditions as described in the above item (C), and the thickness of ash after the test is measured and the presence or absence of ash reactivity is observed visually.

(1) At first, the honeycomb structural body of each of the examples and the comparative examples is placed in the exhaust gas purification apparatus shown in FIG. 6, and then the engine is operated at a revolution number of 3000 rpm under a torque of 50 Nm for a given time to catch particulates (8 g/L), and the regeneration treatment is conducted, and then such operations are repeated 100 times.

(2) After this cycle test, all of the honeycomb structural bodies are cut-out and the thickness of the ash is measured at a distance of 5 mm separated from an axial line (center axis) of the filter in an outward direction and in two places of 125 mm and 240 mm positioned from a one-side end face of the filter in the axial direction thereof (length: 254 mm) to obtain results shown in Table 1.

Figure 8B:
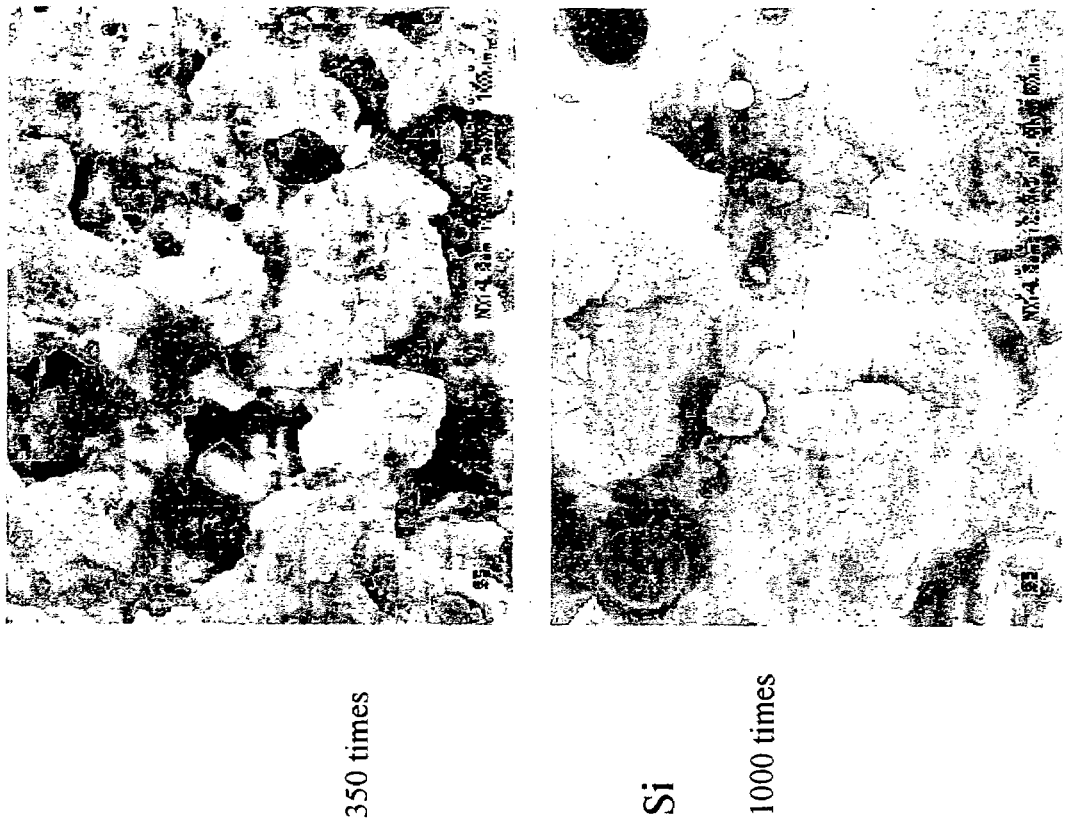
FIG. 8b is an SEM photograph showing a section of the honeycomb structural body of Comparative Example 6.
Figure 8A:
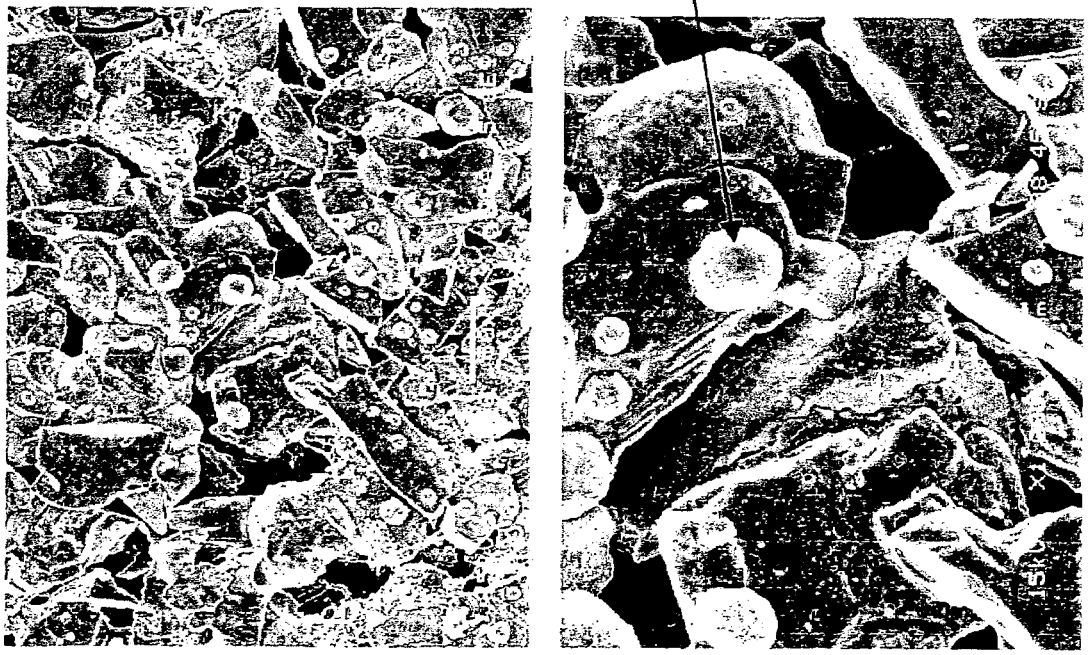
FIG. 8a is an SEM photograph showing a section of the honeycomb structural body of Example 1 after an ash durable test (350 magnification, 1000 magnification)

As seen from the results of the above test, when the honeycomb structural bodies of the examples are subjected to the particulate catching and regeneration treatment 100 times, the ash is easily peeled and stored at the back because the reaction hardly occurs. On the other hand, in the honeycomb structural bodies of the comparative examples and the test examples, the ash is hardly stored at the back. After this cycle test, the central portions of the honeycomb structural bodies of Example 1 and Comparative Example 6 are cut out and washed, and the surfaces of these cut pieces are observed (350 magnification, 1000 magnification) by using a scanning type electron microscope (SEM) to obtain results shown in FIGS. 8a and 8b, respectively.

As seen from these SEM photographs, many pores are observed between ceramic particles bonded through the crystalline silicon in the honeycomb filter of the example, while slight pore is merely observed between the ceramic particles in the honeycomb filter of the comparative example. That is, it is considered that the spaces between the ceramic particles are clogged with the reaction layer in the honeycomb filter of the comparative example.

INDUSTRIAL APPLICABILITY

As mentioned above, the honeycomb structural body according to the invention is excellent in the thermal diffusibility, and also less in the storing of thermal stress and excellent in the resistance to thermal shock even when the temperature distribution or the cool-heat cycle is repeated because the ceramic block constituting the above body is constituted with a composite material consisting of ceramic particles and crystalline silicon and having an excellent thermal conduction. This honeycomb structural body can be used as a filter for the purification of HC, CO and NOx in the exhaust gas discharged from a heat engine such as an internal-combustion engine or the like or a combustion device such as a boiler or the like, or as a catalyst carrier for conducting a quality modification of liquid fuel or gas fuel by carrying a noble metal such as Pt, Rh, Pd or the like or an alloy thereof as a catalyst on the ceramic block, if necessary.

The invention claimed is:

1. A honeycomb structural body comprising:
a ceramic block comprising a composite material comprising ceramic particles and crystalline silicon, the ceramic block having a plurality of through-holes arranged in a longitudinal direction of the ceramic block and separated from each other by a plurality of partition walls, the plurality of through-holes including ones sealed at a first end portion of the ceramic block and ones sealed at a second end portion of the ceramic block, wherein the crystalline silicon has a half-width value of Si peak at 2θ=about 28° which is not more than 0.60° in an X-ray diffraction.

2. A honeycomb structural body according to claim 1, wherein the ceramic block comprises a plurality of prismatic ceramic members bundled together.

3. A honeycomb structural body according to claim 1, wherein the plurality of through-holes in the ceramic block are sealed with a sealing material at one of the first and second end portions.

4. A honeycomb structural body according to claim 1, wherein the composite material comprises a porous ceramic comprising the ceramic particles bonded by the crystalline silicon.

5. A honeycomb structural body according to claim 1, wherein the ceramic particles comprise silicon carbide.

6. A honeycomb structural body comprising:
a ceramic block comprising a composite material comprising ceramic particles and crystalline silicon, the ceramic block having a plurality of through-holes arranged in a longitudinal direction of the ceramic block and separated from each other by a plurality of partition walls, the plurality of through-holes including ones sealed at a first end portion of the ceramic block and ones sealed at a second end portion of the ceramic block, wherein the crystalline silicon has a half-width value of Si peak at 2θ=about 28° which is from 0.1° to 0.6° in an X-ray diffraction.

7. A honeycomb structural body according to claim 6, wherein the ceramic block comprises a plurality of prismatic ceramic members bundled together.

8. A honeycomb structural body according to claim 6, wherein the plurality of through-holes in the ceramic block are sealed with a sealing material at one of the first and second end portions.

9. A honeycomb structural body according to claim 6, wherein the composite material comprises a porous ceramic comprising the ceramic particles bonded by the crystalline silicon.

10. A honeycomb structural body according to claim 6, wherein the ceramic particles comprise silicon carbide.

* * * * *